United States Patent
Wilton et al.

[15] 3,643,345
[45] Feb. 22, 1972

[54] TERRAIN MODEL VIEWING DEVICE

[72] Inventors: Raymond Charles Wilton, Worthing; Peter James Astley, Pulborough, both of England

[73] Assignee: Miles Electronics Limited, Shoreham-by-Sea, Middlesex, England

[22] Filed: Sept. 29, 1969

[21] Appl. No.: 861,669

[30] Foreign Application Priority Data

Oct. 1, 1968    Great Britain.....................46,543/68

[52] U.S. Cl. .........................................35/12 N, 95/1, 95/86
[51] Int. Cl. .........................................B64g 7/00, G09b 9/08
[58] Field of Search................35/12, 25; 95/1, 86; 352/243; 248/122, 123, 277, 282; 343/6 TV

[56] References Cited

UNITED STATES PATENTS

| | | | |
|---|---|---|---|
| 975,070 | 11/1910 | Richardson et al. | 248/282 |
| 2,471,315 | 5/1949 | Dehmel | 35/25 X |
| 2,959,779 | 11/1960 | Miller et al. | 343/6 TV |
| 2,979,832 | 4/1961 | Klemperer | 95/86 X |
| 3,012,337 | 12/1961 | Spenler, Jr. et al. | 35/12 N |
| 3,047,688 | 7/1962 | Small | 248/282 |
| 3,273,484 | 9/1966 | Lapsley | 352/243 |
| 3,278,247 | 10/1966 | Tisdell | 248/277 |
| 3,470,981 | 10/1969 | Huxley | 248/277 |
| 3,507,989 | 4/1970 | Wolff | 35/25 |

Primary Examiner—Robert W. Michell
Assistant Examiner—L. R. Oremland
Attorney—Woodhams, Blanchard and Flynn

[57] ABSTRACT

A terrain model viewing device for an aircraft flight simulator comprises an articulated arm mounting a camera at its free end and having its other end pivotally mounted on a base to one side of the model in the case where the model is horizontal or above or below the model in the case where the model is vertical.

5 Claims, 7 Drawing Figures

INVENTORS
RAYMOND CHARLES WILTON
PETER JAMES ASTLEY
BY
Woodhams, Blanchard & Flynn
ATTORNEYS

3,643,345

TERRAIN MODEL VIEWING DEVICE

The present invention relates to terrain model viewing devices such as are used for example in flight simulators for presenting to a pilot under training a realistic view of the terrain over which he is flying. In one known form of flight simulator, the image of the pilot's view is provided by a cinematographic film system. However such a system presents limitations which have led to the adoption of three dimensional map models which are scanned for example by a television camera following the simulated course of the aircraft which the pilot is "flying." In such an arrangement, the camera may be disposed vertically and view the terrain model through an optical system including a prism or mirror or like system to orientate the field of view to correspond to that which should be seen by the pilot in accordance with the particular attitude and direction of flight of the simulated aircraft at any instant so as to present a realistic view to the pilot. Obviously, the appropriate motion must be applied to the camera to enable it to trace out the course being flown by the pilot.

Such an arrangement is found to have advantages over another known form of terrain simulator in which the camera moves along an axis vertical to the plane of the model and across the width thereof and motion in the forward direction is simulated by moving the map itself relative to the camera in the manner of an endless belt or roller blind.

The problem of supporting the camera for steady and accurate movement over the fixed model presents difficulties. In one known arrangement, the camera is suspended from a gantry spanning the width of the model, the gantry being supported on rails extending parallel to the two sides of the model. The camera together with its optical system, associated driving motors and any lighting equipment associated directly with the camera form a considerable load which may be applied to the gantry at any position across the width of the model. Furthermore a varying amount of cabling has to be paid out and taken up as the camera moves across the gantry and also as the gantry moves over the length of the model. These loads cause a varying deflection of the gantry and a varying drag which may cause the gantry itself to skew relative to its supporting rails. Accordingly there is a risk that the camera will not accurately follow the flight path of the simulated aircraft.

In accordance with the present invention there is provided a terrain model viewing device comprising a camera for viewing the terrain model, a fixed support base and an articulated arm pivotally mounted on the base and supporting the camera.

Conveniently, the articulated arm is in two sections and the axis of articulation between the two sections is vertical, the arm being mounted for pivotal movement on the base about a vertical axis.

With such an arrangement, the camera may be moved to the required position over the map by turning the entire arm relative to the base and simultaneously causing the arm to adopt the required angle between its two parts at the articulation. This may be achieved by suitable motor drives at the articulation and at the support base.

Alternatively, the articulated arm may serve to carry the necessary cabling for the camera and its associated equipment while the camera itself is guided over the map by a gantry travelling along rails on either side of the model. With this arrangement the gantry may be relieved of all the loads due to the cabling and camera and its associated equipment.

With either form of arrangement, if desired the articulated arm may be duplicated to form a parallelogram or pantograph linkage between the support and the camera.

In cases where the entire weight of the camera and its associated equipment is to be supported by the articulated arm, the support base may carry a radially extending support boom which is pivotable around the same axis as the articulated arm, the end of the articulated arm carrying the camera being slidable along the boom. Alternatively the articulated arm may carry a slidable extension which at its far end is hinged to a support member movable along a straight support track.

Embodiments of the invention will now be described by way of example with reference to the accompanying drawings, in which.

Figure 1:
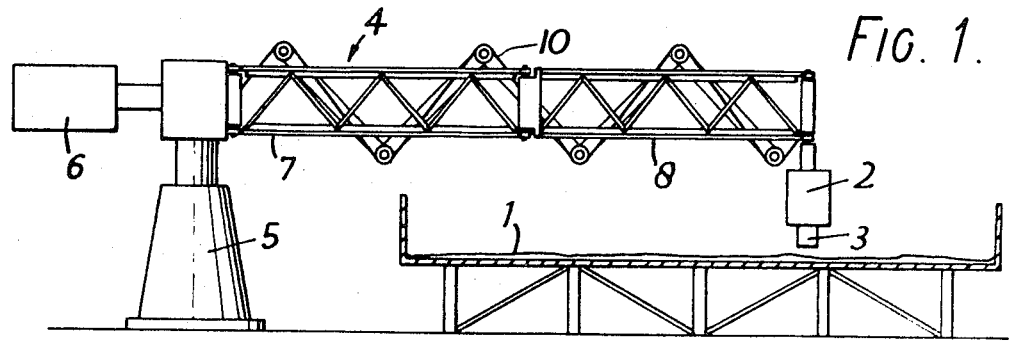
FIG. 1 is a side elevational view of a camera support structure.

Referring to FIG. 1, a three-dimensional terrain model is supported on a table 1 and is to be viewed by a camera 2, the optical axis of which is vertical. The camera 2 carries an optical system 3 which includes a pitch mirror or pitch prism which is tiltable as the simulated "aircraft" pitches or climbs and is rotatable about the optical axis of the camera to change the view in azimuth. The optical system 3 also includes a Dove prism to maintain the view laterally horizontal as the pitch prism or mirror is rotated or to simulate an appropriate degree of roll.

The camera 2 is mounted for rotation about a vertical axis on the end of an articulated arm 4 which can swing about a vertical axis on a support pedestal 5.

The articulated arm 4 is counterbalanced by a counterweight 6 and consists of an inner arm 7 and an outer arm 8 mounted on the outer end of the inner arm 7 for pivotal movement about a vertical axis.

The pedestal support 5 carries an appropriate motor system for rotating the inner arm portion 7 and carries a similar motor system (not shown) to cause an outer arm portion 8 to adopt the required angular position relative to the inner arm portion 7. In this way the two motor systems control the position of the camera 2 at any instant.

The cables 10 associated with the camera 2, the optical system 3 and the motor systems for the camera and articulated arm may be supported on the two arm portions 7 and 8 or alternatively a conventional zigzag arrangement 9 may be used.

Figure 2:
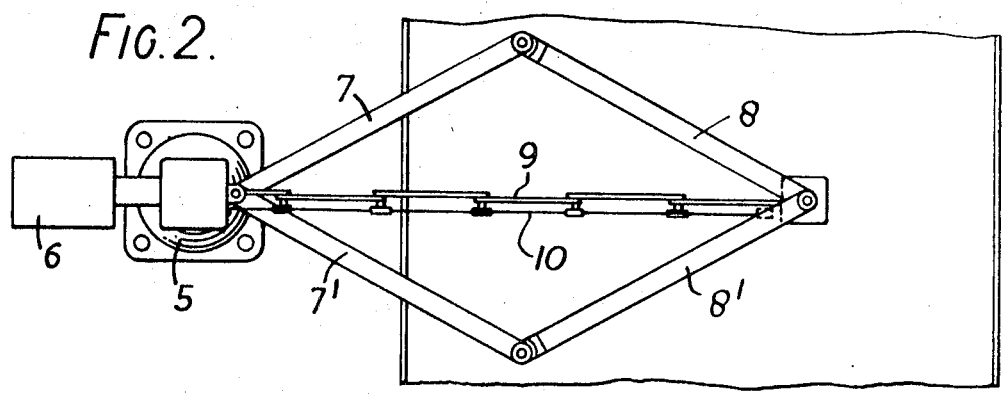
FIG. 2 is a plan view of the structure shown in FIG. 1.

As shown in FIG. 2, the articulated arm may be reinforced by duplicating the inner and outer arm portions 7 and 8 at 7' and 8' to form an isosceles quadralateral in the manner of a pantograph.

Figure 3:
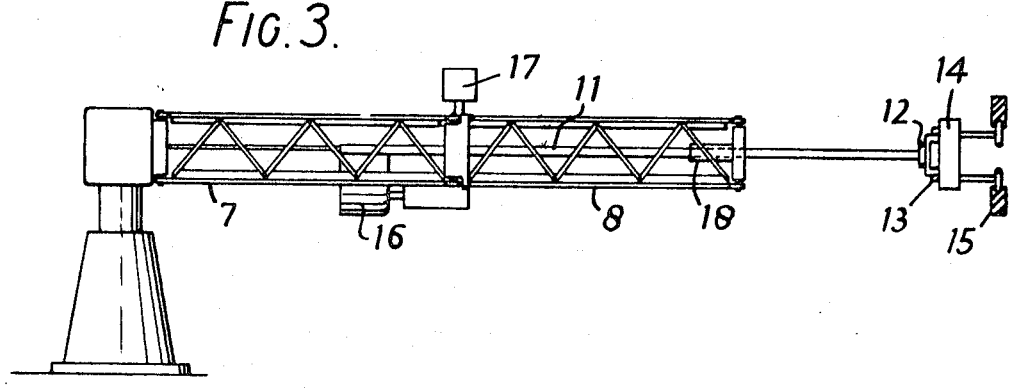
FIG. 3 shows a modification in side elevation.

FIG. 3 shows an arrangement which may be used where it is considered undesirable for the articulated arm, particularly when fully extended, to carry the entire weight of the camera and associated equipment. In this arrangement, a tube or shaft 11 is slidable in the outer arm portion 8 and is hinged at its outer end 12 by means of a hinge pin 13 to a support 14 which is slidable along a horizontal track 15.

FIG. 3 also shows the motor system 16 for controlling the articulation between the inner and outer arm portions 7 and 8 and an encoder 17 which transmits the instantaneous value of the angle of the inner and outer portions 7 and 8 to the control of the flight simulator.

Figure 4:
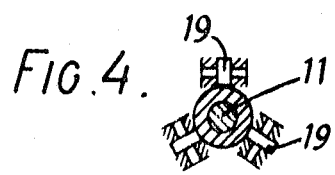
FIG. 4 shows a detail of FIG. 3 in cross section.

The tube or shaft 11 may be slidable in bushes and sleeves 18 (FIG. 3) or run through groups of rollers, for example ballraces 19 (FIG. 4).

Figure 5:
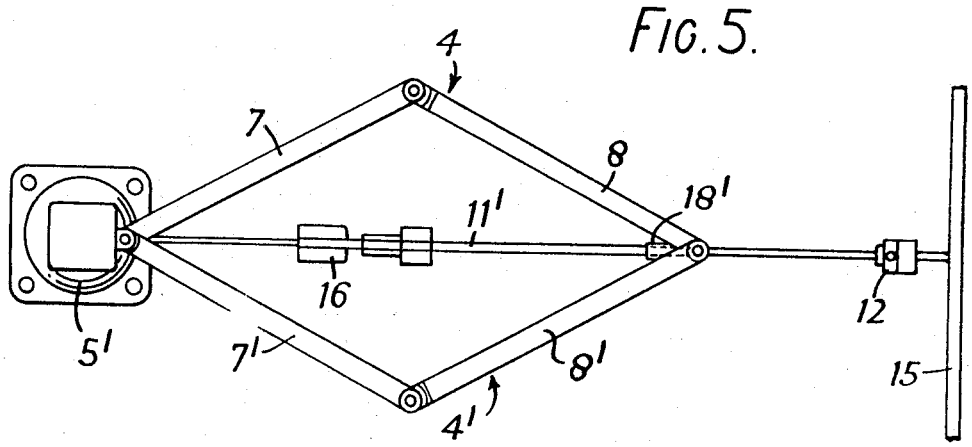
FIG. 5 shows a plan view of FIG. 3.

FIG. 5 shows in plan view an arrangement of the kind shown in FIGS. 3 and 4. The camera and its optical system are mounted at the outer end of the isosceles quadrilateral formed by the twin articulated arms 4 and 40'. The camera is moved along the support tube 11' by a rack and pinion drive (not shown) while the entire assembly turns around the pedestal 5' by an appropriate motor drive. With this arrangement, the motor driving system for moving the camera along the required course is greatly simplified in that the two motors associated with the rack and pinion drive and the pedestal merely have to impress the required polar coordinates on to the path traced out by the camera.

Figure 6:
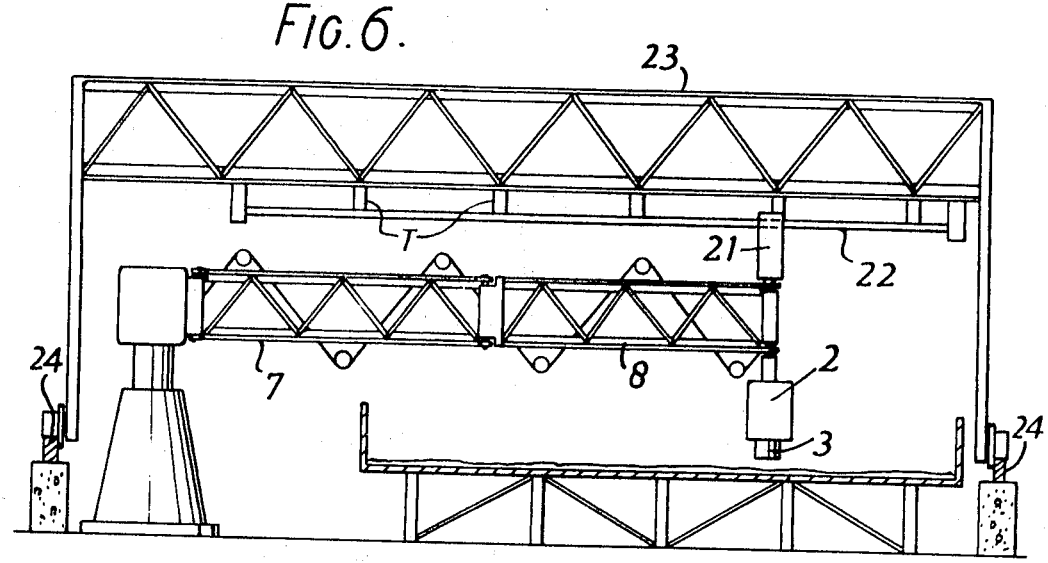
FIG. 6 shows another embodiment of the invention in transverse section.
Figure 7:
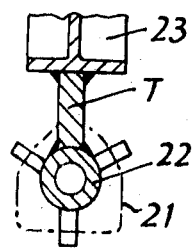
FIG. 7 shows a detail of FIG 6 on an enlarged scale.

FIG. 6 shows an alternative arrangement for providing extra support for the camera 2. In this arrangement, a slider 21 is pivotally connected to the outer end of the outer arm portion 8 and is engaged over a guide rail in this case formed by a tube 22 slung along the underside of a gantry 23 by means of spaced ties T which are sufficiently close to each other to avoid appreciable sagging of the tube 22 under the weight of the camera 2, its associated equipment and the other end of the articulated arm.

The gantry 23 is supported on rails 24 extending along either side of the table 1. Preferably, the gantry is independently driven up and down the rails 24 in synchronism with the movements of the articulated arm.

The arrangement according to the invention may also be applied to terrain models of the vertical type that is in which the terrain model is mounted on a wall or vertically extending freestanding support. In this case, the pedestal 5 will be mounted either above the top edge of the terrain model or below the bottom edge thereof, the axes of pivotal movement being horizontal.

In all the embodiments described above, the camera will also be moved at right angles to the plane of the map to simulate the altitude of the aircraft. This may be achieved by an appropriate rack and pinion or screwjack arrangement.

We claim:

1. In a simulator, a device for viewing a terrain model, comprising camera means for viewing said terrain model, a fixed support base and an articulated arm having first and second arm sections, the first arm section having one end pivotally mounted on said base about a first axis and the other end articulated to one end of the second arm section about a second axis parallel to said first axis, the other end of the second arm section being a free end carrying said camera means, first motor means for controllably swinging said arm about said base and second motor means for controllably varying the angle of articulation between said first and second arm sections, said first and second motor means being responsive to signals from said simulator.

2. A device according to claim 1, including a transverse guide track disposed adjacent the terrain model, a guide member movable along said guide track and a rod articulated to said guide member and slideably supporting the free end of said arm.

3. A device according to claim 1, including a gantry spanning the terrain model, a guide track mounted on and extending along the gantry, means mounting the gantry for movement in a direction substantially transverse to the elongated direction of the guide track, and a guide member mounted on said guide track for movement therealong, the guide member being articulated to the free end of said articulated arm.

4. A device according to claim 1, wherein said axes are horizontal and said terrain model extends vertically.

5. A device according to claim 1, wherein said arm includes third and fourth arm sections, the third arm section having one end pivotally mounted on said base about said first axis and the other end articulated to one end of the fourth arm section about a third axis parallel to said first axis, the other end of the fourth arm section being pivotally connected to the free end of said second arm section about an axis parallel to said first axis.

* * * * *